United States Patent [19]

White

[11] 4,030,066
[45] June 14, 1977

[54] AUTOMATIC CANCELLATION MEANS FOR VEHICLE TURN INDICATOR SIGNALS

[76] Inventor: Rowland Kent White, 420 Kisconko Turn, Oxon Hill, Md. 20022

[22] Filed: Aug. 17, 1976

[21] Appl. No.: 715,134

[52] U.S. Cl. .................. 340/73; 340/134; 340/56; 200/61.45 R
[51] Int. Cl.² ............. B60Q 1/34; G01C 19/02
[58] Field of Search ............. 340/73, 134, 62, 56; 200/DIG. 19, 61.45

[56] References Cited
UNITED STATES PATENTS

| 2,202,987 | 6/1940 | Egenas | 200/DIG. 19 |
| 2,464,592 | 3/1949 | Leathers et al. | 200/DIG. 19 |
| 3,555,506 | 1/1971 | Daws | 340/73 X |
| 3,555,507 | 1/1971 | Burson, Jr. | 340/73 X |

Primary Examiner—Donald J. Yusko
Attorney, Agent, or Firm—Boris Haskell

[57] ABSTRACT

Turn indicator signals for a vehicle are manually set to signal selectively a left or right turn, and are automatically cancelled on completion of the turn by means of a gyroscope mounted on the vehicle, utilizing the precession movement of the gyroscope as results from the turning movement of the vehicle to actuate a signal cancellation means.

7 Claims, 2 Drawing Figures

AUTOMATIC CANCELLATION MEANS FOR VEHICLE TURN INDICATOR SIGNALS

SUMMARY AND BACKGROUND OF THE INVENTION

The present invention relates to turn indicator signals for vehicles, and particularly to the use of a gyroscope to effect the automatic cancellation of a turn indication. The present invention is applicable to all vehicles, but it is considered that the invention is particularly useful as applied to two wheeled vehicles, such as motorcycles. Therefore, although the invention is described herein at times specifically in relation to motorcycles, it is understood that it is not limited thereto.

Vehicle turn indicator signals are generally well known in the art. An operator closes a double throw switch from a neutral open position to one closed position to signal a left turn, or to the other closed position to signal a right turn. An appropriate set of lights operated through a flasher, usually a thermal flasher, is actuated to indicate the intended direction of turn. Upon completion of the turn, the switch is returned, preferably automatically, to its neutral position to cancel the turn signal.

In four wheeled vehicles, automatic cancellation of a turn indicator signal is most commonly effected through a mechanical mechanism associated with the steering column. However, in the case of motorcycles, turns are often effected with only slight and nearly imperceptible turning of the steering column or front wheel fork. Therefore, the conventional approach used on four wheeled vehicles to cancel turn indicator signals cannot be used effectively on motorcycles. Accordingly, it has been proposed to rely on inertial or gravitational means, such as a specially designed mercury switch or pendulum, to effect automatic cancellation of turn signals on motorcycles, as suggested for example in U.S. Pat. No. 3,876,976 to R. H. Cross, Jr.. However, because the turning of a motorcycle depends upon a combination of turning of the front wheel and lean of the vehicle, such inertial devices are not entirely reliable.

In accordance with the present invention, automatic cancellation of a turn signal is controlled by a gyroscope, which provides an effective and reliable cancellation operation, except possibly on the slightest degree of turn, as may be experienced for example in a lane change. A manually operated double throw switch is moved from a neutral open switch position to one of two closed switch positions to energize a flasher circuit for actuating either a left turn or right turn signal. The manual switch is retained in the selected closed position by a detent latch structure, or the like. When the vehicle is then turned in the direction indicated, a gyroscope mounted on the vehicle is caused to precess; and when the turn is completed, a resilient restraining means causes the gyroscope to return to its starting position. This precession movement of the gyroscope, and particularly the return movement, is utilized to cancel the turn signal. Thus, it will be appreciated that turn signal cancellation results from a change in heading or direction of the vehicle, and is accomplished independently of either the lean of the vehicle or the movement of its steering column. The invention is therefore particularly well adapted to use on motorcycles, although it is not limited thereto.

It is therefore one object of the present invention to provide for the automatic cancellation of a vehicle's turn indicator signal upon completion of a turn.

Another object of the present invention is to provide for such cancellation as a result of a change in heading of the vehicle, independently of the lean of the vehicle or the movement of its steering column.

And still another object of the present invention is to provide for the automatic cancellation of a turn indicator signal upon completion of a turn, which is particularly suited for two wheeled vehicles, such as motorcycles.

DESCRIPTION OF DRAWINGS

Other objects and advantages of the invention will become apparent, and the nature of the invention will be better understood, from a consideration of the following illustrative detailed description of one embodiment of the invention, had in conjunction with the accompanying drawings in which like reference characters refer to like or corresponding parts, and wherein.

DETAILED DESCRIPTION

Figure 1:
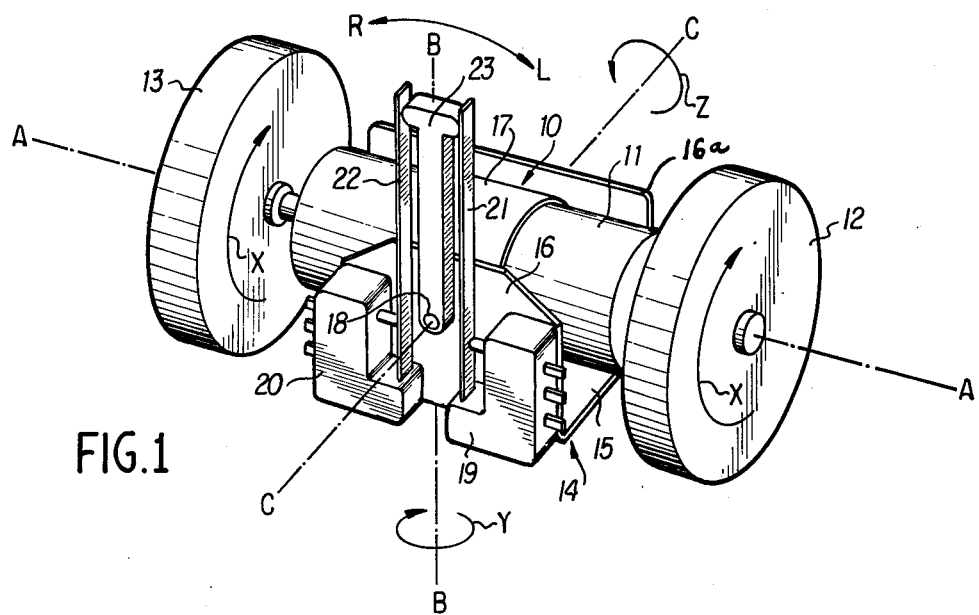
FIG. 1 is perspective view of a gyroscope structure and mount utilized in the practice of the present invention.

Referring to FIG. 1, a gyroscope 10 is shown as comprised of an electric motor 11 and a pair of balanced rotors 12 and 13 mounted on the motor shaft for rotation therewith. The gyroscope is mounted on a U-shaped bracket 14, having a horizontal base 15 and two vertical plates 16 and 16a. A yoke 17 is clamped about the center of the casing of motor 11 and carries a pivot pin 18 that extends through a bearing therefor (not shown) in plate 16 of bracket 14, and a corresponding pivot structure associated with plate 16a. The pivot pin 18 is located on an axis that passes through substantially the center of gravity of the motor and rotor assembly.

A pair of microswitches 19 and 20 are mounted in opposed relationship on the side of plate 16 opposite from that of the motor 11, and each microswitch has a respective resilient operating reed or arm 21 and 22. A switch actuator lever 23 is mounted on the pivot pin 18 for movement therewith, and is thus located between the microswitch operating reeds 21 and 22, in position to actuate one or the other of switches 19 and 20 through the reeds 21 and 22, in response to pivotal movement of pin 18. Also, resilient reeds 21 and 22 tend to drive the actuator 23 to a center position therebetween, and thus retain the gyroscope in a null position shown in FIG. 1.

The spin axis of the gyroscope 10 is indicated by the line A—A, its operational axis of torque is indicated axis of torque is indicated by the line B—B, and its resultant axis of precession by the line C—C. Thus, with motor 11 spinning the rotors 12 and 13 in the direction of arrows X, a torque applied to axis B—B in the direction of arrow Y, causes the gyroscope to precess about axis C—C in the direction of arrow Z. Application of a torque in the opposite direction from that of arrow Y causes precession in the opposite direction from that of arrow Z.

It is contemplated that bracket 14 be fixedly mounted on a motorcycle at any convenient location that is stable and fixed relative to the vehicle frame, and preferably so that the spin axis A—A is close to horizontal and axis B—B is close to vertical and the hyroscope is above the bracket plate 15. With this orientation, a torque in the direction of arrow Y may be considered to represent a right turn. If the rotors 12 and 13 are spinning in the direction of arrows X, the gyroscope precession will then be in the direction of arrow Z. This causes switch actuator arm 23 to pivot counterclockwise in FIG. 1 and to operate switch 20 through reed 22. As the turn is completed, the torque represented by the arrow Y ceases, and reed 22 returns the gyroscope to its null position shown in the drawing. It is apparent from the foregoing that a left turn similarly causes actuator 23 to operate switch 19 through reed 21.

Figure 2:
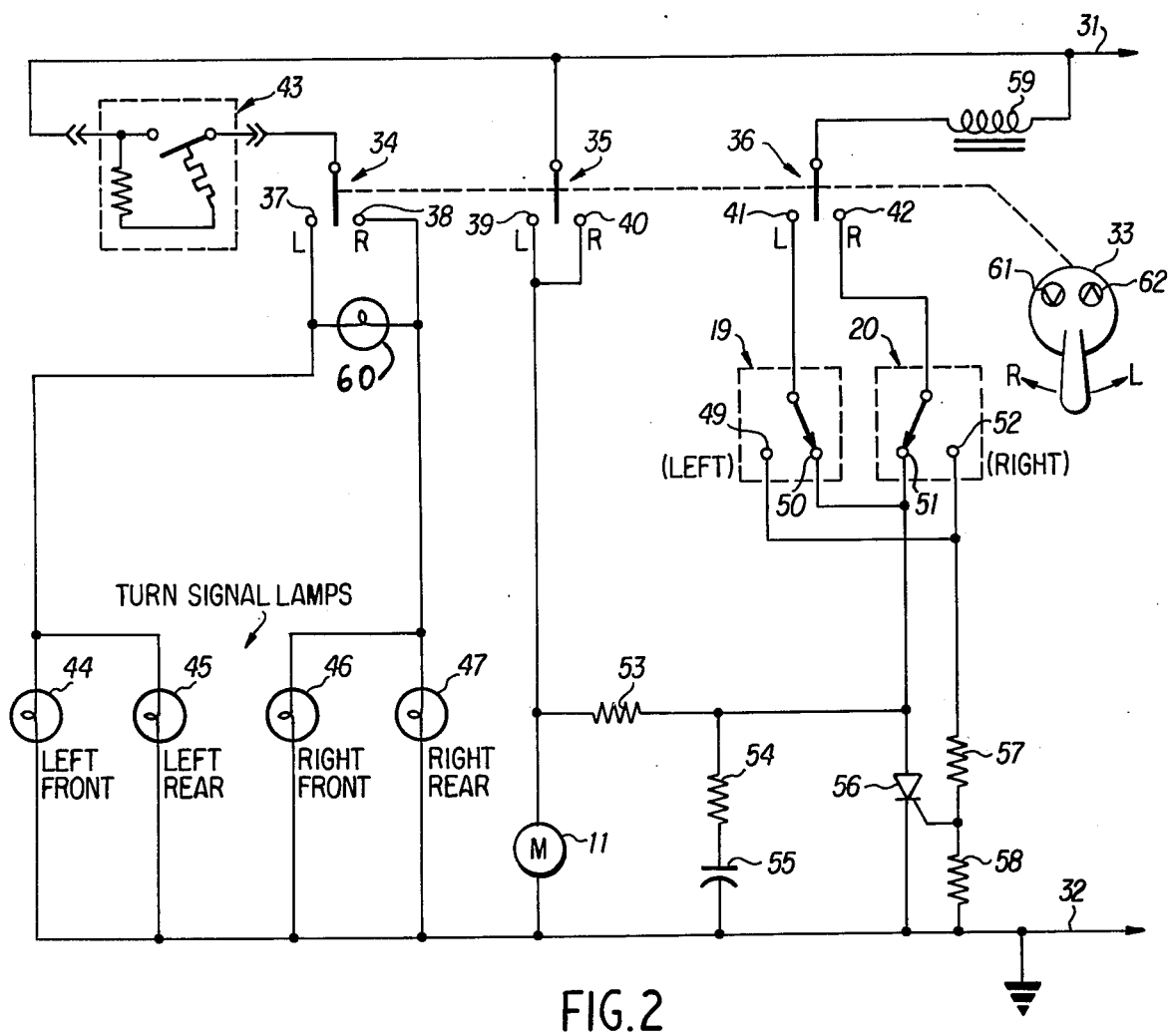
FIG. 2 is a diagram of a circuit utilized in the practice of the present invention.

The electrical leads for applying power to motor 11 and for connection to the switches 19 and 20 are not shown in FIG. 1. However, the motor and switches are indicated in the circuit diagram of FIG. 2 with the same reference characters applied thereto. Power for the electrical circuit of FIG. 2 is obtained from the ignition circuit or battery of the vehicle and is applied through input leads 31 and 32. Operation of the turn indicator signal circuit is effected and controlled by manual lever 33, which operates the three ganged switches 34, 35 and 36. Control lever 33 is shown in its neutral position, and the corresponding open position for the three switches 34, 35 and 36 is shown in the drawing of FIG. 2. To signal a left turn, lever 33 is rotated counterclockwise, or to the right, to a detented latch position, whereupon said three switches are closed to their left contacts 37, 39 and 41. A right turn is signalled by moving lever 33 clockwise, or to the left, to a detented latch position, which causes said three switches to close to their right contacts 38, 40 and 42.

When switch 34 is closed to either contacts 37 or 38, power is applied across the conventional thermal flasher 43, and across either the left turn signal lights 44 and 45, or the right turn signal lights 46 and 47. Under control of the flasher 43, the signal lights will provide a flashing indication of either a left or right turn.

Closure of switch 35 is effected simultaneously with closure of switch 34, and closure of switch 35 to either of its contacts 39 or 40 energizes the gyroscope motor 11, and applies a latching and holding potential through resistor 53 across silicon controlled rectifier 56. It is apparent that, if desired, motor 11 could be continuously energized when the vehicle is in operation, instead of being energized through switch 35.

Switch 36 operates in unison with switches 34 and 35. For a left turn signal, switch 36 is closed to contact 41 which connects microswitch 19 in the power circuit; and for a right turn, switch 36 is closed to contact 42 which connects microswitch 20 in the power circuit. Microswitches 19 and 20 are shown in their normal positions closed to contacts 50 and 51. Thus, when switch 36 is closed to either of its contacts, a circuit is completed through contact 50 or 51 of microswitch 19 or 20 to the anode of SCR 56. The SCR is in its non-conducting state at this point, and resistor 54 and capacitor 55 form a rate effect suppression network to prevent the SCR from being prematurely switched to a conductive state when its anode voltage is suddenly raised by closure of switch 35 or 36.

Microswitches 19 and 20 are operated, as shown in FIG. 1, by the gyroscope 10 through actuator 23 and reeds 21 and 22, as previously described. Thus, during a left turn, precession of the gyroscope 10 causes microswitch 19 to open from contact 50 and close to contact 49; and during a right turn, precession in the reverse direction causes microswitch 20 to open from contact 51 and close to contact 52. Closure of either switch 19 to contact 49 or switch 20 to contact 52 applies a potential across the voltage divider resistors 57 and 58, and thus triggers SCR 56 into its conductive state through its gate electrode. Once conductive, SCR 56 remains conductive as long as switch 35 remains closed. As the turn is completed, the gyroscope 10 is returned to its null position under the influence of resilient reeds 21 and 22, as explained above with reference to FIG. 1. This action returns the microswitch 19 or 20 to its normal position closed to contact 50 or 51. Since SCR 56 is now conductive and switch 36 is closed to contact 41 or 42, current flows through solenoid coil 59. The solenoid armature (not shown) releases the detent latch for turn signal switch operating lever 33, causing it to be spring returned to its neutral position, and thereby causing switches 34, 35 and 36 to be returned to their open positions. Thus, all circuit elements are denergized, and the turn indicator signal is cancelled. The detent latch for operating lever 33, the solenoid operator therefor, and the spring return are all well understood in the art, and therefore are not shown in the drawing.

It is conventional to provide for a manually controlled momentary turn signal for lane changing. This is accomplished with the present circuit simply by providing for closure of switch 34 in advance of reaching the detent latch position for operating lever 33. Also, the detent latch can be manually overridden so that a turn signal can be cancelled at will by the operator. An audible signal can also be included, if desired, as a reminder to the operator that a turn signal is in effect.

The circuit of FIG. 2 also includes a pilot lamp 60. This lamp is physically located under the control lever 33, and in a position to register with a directional indicator window 61 or 62 when the control lever is rotated to effect a turn signal, providing a visual indication to the operator that a turn indicator signal is in effect and the directional sense thereof. Pilot lamp 60 is illuminated when switch 34 is closed to either contact 37 or 38. The circuit across the lamp 60 is completed from the closed switch contact through the non-illuminated or non-signalling pair of lights 44 and 45, or 46 and 47, to ground. In view of the resistance of lamp 60, the amount of current is not sufficient to illuminate that pair of lights.

Thus, the operation of the present system is as follows. Starting with the system in its rest and inactive state, as shown in the drawings, the gyroscope motor 11 is at rest, the actuator arm 23 is in the null position, switches 34, 35 and 36 are open, and microswitches 19 and 20 are closed to their respective contacts 50 and 51. To signal a right turn, control switch lever 33 is moved clockwise in FIG. 2 to close switches 34, 35 and 36 to their respective contacts 38, 40 and 42. Signal lights 46 and 47 immediately go into a flashing signal mode under control of the thermal flasher 43, and gyroscope motor 11 is energized and quickly comes up to speed. As a right turn is executed, gyroscope 10 precesses in the direction of arrow Z, causing actuator arm 23 to operate switch 20 to open contact 51 and to close contact 52, thereby triggering SCR 56 into its conductive state. The value of resistors 57 and 58 are selected so that the amount of current flowing through the circuit of switches 36 and 20 at this point is insufficient to actuate the solenoid of coil 59. As the right turn is completed, the precession force on gyroscope 10 is eliminated, and the resilient force of reed 22 causes switch 20 to return to its normal condition i.e. closed to contact 51. Since SCR 56 is now in a conductive state, a large current now flows from power lead 31 through solenoid coil 59, switch 36 and its contact 42, switch 20 and its contact 51, and SCR 56, to power lead 32. This current through coil 59 is sufficient to operate the solenoid armature and cause switch control lever 33 to be released from its detent latched right turn signal position and return to its neutral position. This action opens all the switches 34, 35 and 36, thereby cancelling the turn indicator signal. Operation of the system for a left turn signal will be apparent from the foregoing description.

The foregoing specific embodiment is presented as illustrative of the invention, to facilitate a complete understanding thereof. It is apparent, however that numerous changes and modifications can be made, and such as are embraced by the spirit and scope of the appended claims are contemplated as being within the purview of this invention.

What is claimed is:

1. In a turn indicator signal system for a vehicle having, turn signal means, selectively operable means for activating and deactivating said turn signal means, and means for automatically deactivating said turn signal means upon completion of a turn by the vehicle, the improvement wherein said automatically deactivating means comprises: a gyroscope mounted on said vehicle and having an axis of torque and an axis of precession, said axis of torque being located to respond to turning movements of the vehicle, means pivotally mounting said gyroscope on said axis of precession, and means responsive to pivotal movement of said gyroscope about said axis of precession for deactivating said turn signal means.

2. In a turn indicator signal system for a vehicle as set forth in claim 1, means yieldingly restraining said gyroscope to a null position on said axis of precession.

3. In a turn indicator signal system for a vehicle as set forth in claim 2, said means responsive to pivotal movement operating to deactivate said turn signal means on movement of said gyroscope from a precessed position to said null position.

4. In a turn indicator signal system for a vehicle as set forth in claim 2, said means responsive to pivotal movement comprising an electrical circuit having a switch means, said switch means being operated by said pivotal movement of said gyroscope.

5. In a turn indicator signal system as set forth in claim 4, said switch means having two operating positions, on precession movement of said gyroscope from said null position said switch means being actuated from a first operating position to a second operating position, and on return movement of said gyroscope to said null position said switch means being actuated from said second operating position to said first operting position.

6. In a turn indicator signal system as set forth in claim 5, said circuit including a bistable means having a conductive state and a substantially non-conductive state, means responsive to said switch means in said second operating position to convert said bistable means from a non-conductive to a conductive state, signal cancellation means, and means coupling said cancellation means to said bistable means when said switch means is in said first operating position, said cancellation means operating said selectively operable means to deactivate said turn signal means when said cancellation means is coupled to said bistable means in its conductive state.

7. In a turn indicator signal system as set forth in claim 6, said turn signal means being an electrical flashing light means, said selectively operable means being a manually operated switch means having a neutral position, a first detented latch position for signalling a left turn, and a second detented latch position for signalling a right turn, and said cancellation means including a solenoid means for releasing said manually operated switch means from a detented latch position.

* * * * *